US010485032B2

(12) United States Patent
Kotecha et al.

(10) Patent No.: US 10,485,032 B2
(45) Date of Patent: Nov. 19, 2019

(54) PROVIDING A NETWORK GATEWAY FOR USER DEVICES

(71) Applicant: Verizon Patent and Licensing Inc., Arlington, VA (US)

(72) Inventors: Lalit R. Kotecha, San Ramon, CA (US); John F. Macias, Antelope, CA (US); Sagiv Draznin, Walnut Creek, CA (US); Donna L. Polehn, Kirkland, WA (US); Kumar Sanjeev, San Ramon, CA (US); Arda Aksu, Martinez, CA (US); Patricia Ruey-Jane Chang, San Ramon, CA (US); David Chiang, Fremont, CA (US); Mingxing S. Li, San Jose, CA (US); Xuming Chen, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 407 days.

(21) Appl. No.: 14/634,549

(22) Filed: Feb. 27, 2015

(65) Prior Publication Data
US 2016/0255662 A1    Sep. 1, 2016

(51) Int. Cl.
*H04W 72/04*    (2009.01)
*H04W 76/10*    (2018.01)
(Continued)

(52) U.S. Cl.
CPC ........... *H04W 76/10* (2018.02); *H04W 12/06* (2013.01); *H04W 76/12* (2018.02); *H04W 88/04* (2013.01);
(Continued)

(58) Field of Classification Search
CPC ..... H04W 12/06; H04W 88/04; H04W 88/16; H04W 88/06; H04W 76/02;
(Continued)

(56) References Cited

U.S. PATENT DOCUMENTS

| 2006/0002328 | A1* | 1/2006 | Naghian | ............... | H04W 84/08 370/328 |
| 2007/0140159 | A1* | 6/2007 | Eronen | .................. | H04L 12/12 370/328 |

(Continued)

OTHER PUBLICATIONS

Wikipedia, "Internet Connection Sharing", http://en.wikipedia.org/wiki/Internet_Connection_Sharing, Dec. 15, 2014, 4 pages.
(Continued)

*Primary Examiner* — Un C Cho
*Assistant Examiner* — Rasha K Fayed

(57) ABSTRACT

A device may receive information associated with establishing a gateway connection. The gateway connection may be an ad hoc connection to a user device that permits the user device to transfer network traffic to/from a base station via another user device and without the user device directly connecting to the base station via a radio access network. The information being associated with determining that a gateway establishment condition is satisfied. The device may cause the gateway connection to be established based on the information associated with establishing the gateway connection. The device may cause the user device to utilize the gateway connection to transfer network traffic to/from the base station.

20 Claims, 10 Drawing Sheets

(51) Int. Cl.
*H04W 12/06* (2009.01)
*H04W 88/16* (2009.01)
*H04W 88/04* (2009.01)
*H04W 76/12* (2018.01)
*H04W 84/12* (2009.01)
*H04W 12/00* (2009.01)

(52) U.S. Cl.
CPC ...... *H04W 88/16* (2013.01); *H04W 12/00403* (2019.01); *H04W 84/12* (2013.01)

(58) Field of Classification Search
CPC . H04W 76/023; H04W 76/002; H04W 84/12; H04W 84/18; H04W 92/02; H04W 72/04; H04W 40/20; H04W 40/18; H04W 40/12; H04W 40/24; H04W 4/00; H04W 4/14; H04L 65/1006; H04L 65/1026; H04L 65/1036; H04L 65/1043; H04L 65/1016; H04L 45/00; H04L 45/22; H04L 45/30; H04L 12/56; H04L 12/58; H04L 12/28; H04L 67/16; H04L 67/04; H04L 67/26; H04L 67/327; H04L 67/2871; H04L 67/306; H04L 67/2838; H04L 29/10; H04B 7/18506
USPC .......................................... 370/254, 328, 352
See application file for complete search history.

(56) References Cited

U.S. PATENT DOCUMENTS

| | | | | |
|---|---|---|---|---|
| 2009/0075625 | A1* | 3/2009 | Jackson | H04W 4/90 455/404.1 |
| 2011/0234399 | A1* | 9/2011 | Yan | G08B 21/24 340/539.32 |
| 2011/0317709 | A1* | 12/2011 | Cuervo | H04M 15/66 370/401 |
| 2012/0201204 | A1* | 8/2012 | Raouf | H04W 8/245 370/328 |
| 2012/0307681 | A1* | 12/2012 | Hirata | H04W 48/16 370/254 |
| 2013/0077531 | A1* | 3/2013 | Chu | H04W 88/06 370/255 |
| 2013/0077567 | A1* | 3/2013 | Fujita | H04W 48/17 370/328 |
| 2013/0094395 | A1* | 4/2013 | Lopez | H04L 29/12066 370/254 |
| 2013/0304857 | A1* | 11/2013 | Li | H04W 8/186 709/217 |
| 2014/0183962 | A1* | 7/2014 | Qian | H02J 7/025 307/104 |
| 2015/0120575 | A1* | 4/2015 | Joshi | G06Q 30/0221 705/80 |
| 2015/0131499 | A1* | 5/2015 | Hall | H04L 45/74 370/310 |
| 2015/0282210 | A1* | 10/2015 | Li | H04W 76/14 455/436 |
| 2016/0055576 | A1* | 2/2016 | Reddy | G06Q 30/0645 705/80 |
| 2016/0088570 | A1* | 3/2016 | Cui | H04W 52/18 370/311 |
| 2016/0219637 | A1* | 7/2016 | Dory | H04B 5/0031 |

OTHER PUBLICATIONS

Wikipedia, "Tethering", http://en.wikipedia.org/wiki/Tethering, Dec. 13, 2014, 4 pages.

* cited by examiner

PROVIDING A NETWORK GATEWAY FOR USER DEVICES

BACKGROUND

A base station may provide network connectivity to multiple user devices via a long term evolution (LTE) network connection. Each connection with a user device may be assigned a particular quantity of network resources to provide voice service, data service, overhead control messages, or the like.

DETAILED DESCRIPTION OF PREFERRED EMBODIMENTS

The following detailed description of example implementations refers to the accompanying drawings. The same reference numbers in different drawings may identify the same or similar elements.

A user device may connect to a radio access network (RAN) via a radio access network connection with a base station (e.g., a long term evolution (LTE) connection, a 3G connection, an evolved high speed packet access (HSPA+) connection, or the like). The base station may allocate a quantity of network resources for transferring network traffic to/from the user device and for exchanging overhead control messages with the user device. When a threshold quantity of user devices connect to the base station, the user devices may experience degraded network performance as a result of an insufficient quantity of network resources being available for each user device. Moreover, some of the user devices may experience poor signal quality when at a particular location, such as being inside a building, while other nearby user devices experience strong signal quality. Implementations, described herein, may cause a particular user device to provide a gateway connection for a set of other user devices, thereby reducing the quantity of network connections to the base station and improving network performance, as well as improving signal quality for the set of other user devices.

When a user device is connected directly to a base station and not being utilized to provide a gateway connection for another user device, the user device may be termed a primary user device utilizing a primary connection mode. When the user device is connected to the base station and being utilized to provide a gateway connection, the user device may be termed a gateway user device utilizing a gateway mode. When the user device is connecting to the base station via a gateway user device, the user device may be termed a secondary user device utilizing a secondary mode. A user device may switch from one mode to another based on receiving information, based on a user instruction, or the like, as described herein.

Figure 1A:
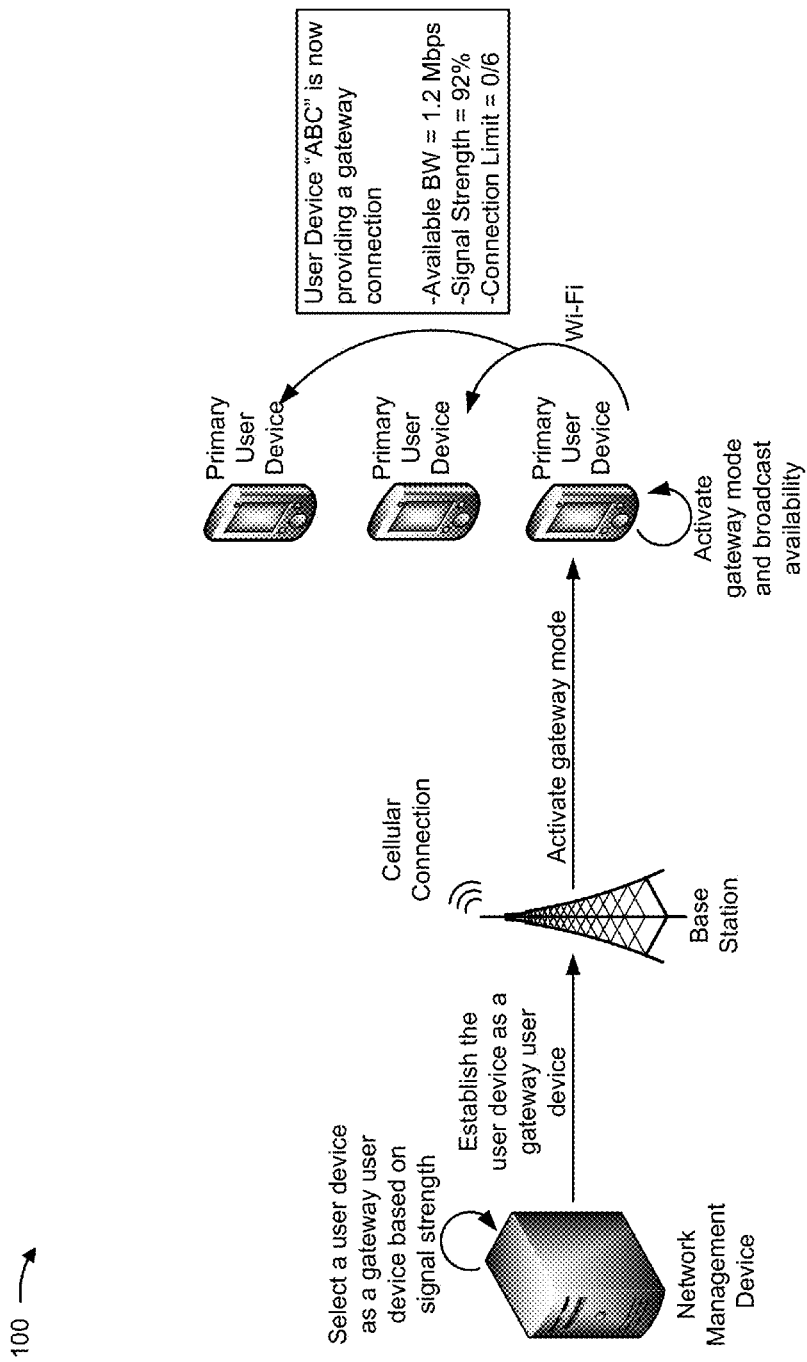
FIGS. 1A and 1B are diagrams of an overview of an example implementation described herein.
Figure 1B:
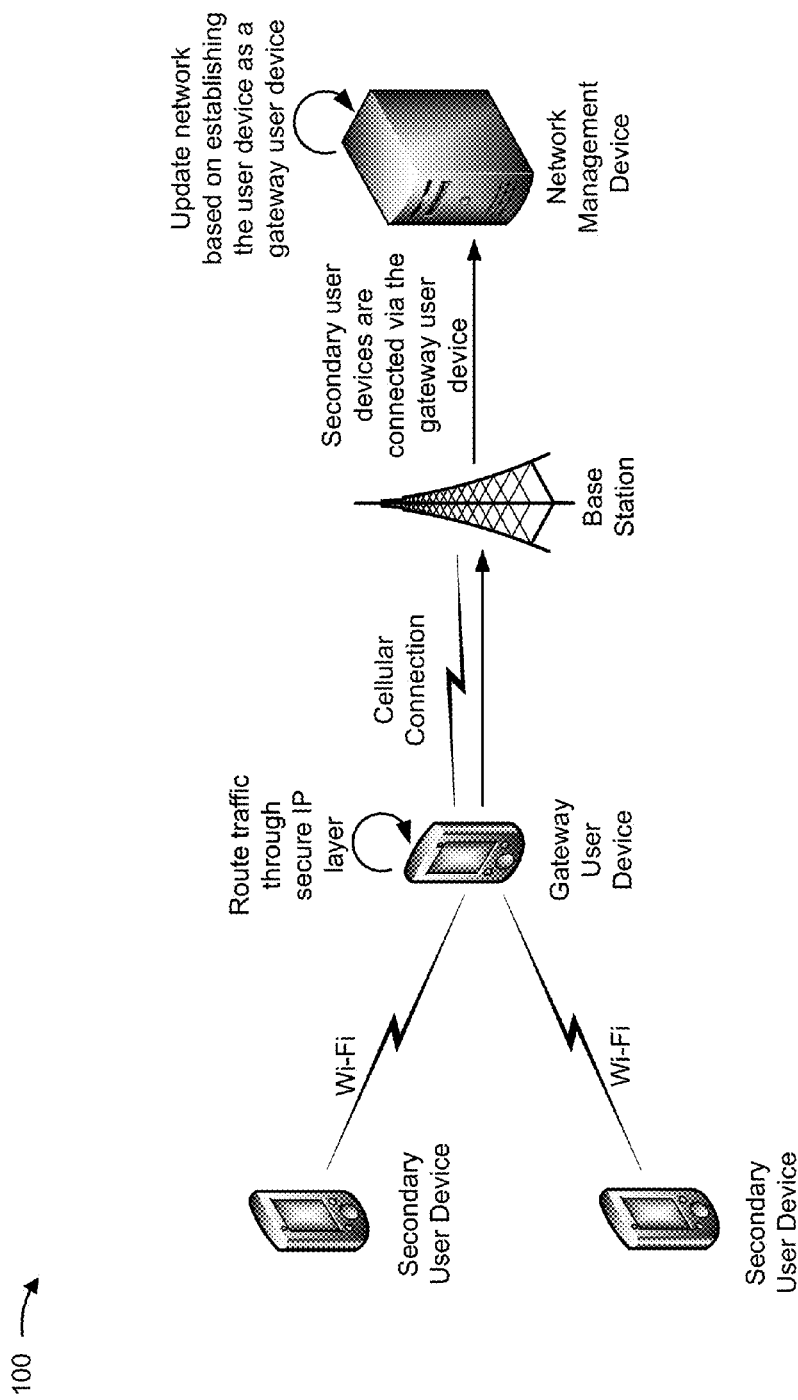

FIGS. 1A and 1B are diagrams of an overview of an example implementation 100 described herein. As shown in FIG. 1A, a set of user devices may connect to a base station as primary user devices via a cellular network connection (e.g., an LTE connection, an HSPA+ connection, etc.). A network management device may select a particular primary user device from the set user devices for utilization as a gateway user device based on a set of selection criteria. For example, the network management device may select the particular primary user device based on determining that the particular primary user device is available for selection and based on determining that the signal strength associated with communications between the particular primary user device and the base station is comparatively better than the signal strength for other primary user devices of the set of user devices.

The network management device may provide, via the base station, information associated with instructing the particular primary user device to activate a gateway mode to establish a gateway connection for other user devices. The particular primary user device may receive the information and may activate the gateway mode and broadcast availability as a gateway user device. The particular primary user device may now be termed the gateway user device.

The gateway user device may provide, via an ad hoc network connection (e.g., a Wi-Fi network connection broadcast by the gateway user device and detected by the other primary user devices), information identifying available bandwidth via a gateway connection, signal strength for the connection with the base station, and a maximum quantity of secondary user devices that may connect. Assume that the other primary user devices receive credential information associated with utilizing the gateway connection and connect to the particular gateway user device based on the particular gateway user device determining that the credential information is valid. The other primary user devices may now be termed secondary user devices.

As shown in FIG. 1B, the gateway user device may connect to the base station via the cellular network connection (e.g., via LTE, via HSPA+, etc.) and may connect to the secondary user devices via the gateway connection (e.g., via Wi-Fi). The base station may allocate a particular quantity of network resources to the gateway user device, and may provide overhead control messages to the secondary user devices via network resources allocated to the gateway user device. The gateway user device may route network traffic associated with the secondary user devices using a secure Internet protocol (IP) layer connection. For example, the gateway user device may receive network traffic from a particular secondary user device via a Wi-Fi connection and may route the network traffic to the base station via an LTE connection for further routing (e.g., to a packet data network gateway (PGW), or the like).

The gateway user device may provide information to the network management device (e.g., via the base station) indicating that the secondary user devices are connected via the gateway connection. The network management device may receive the information and may update one or more network devices to indicate that the secondary user devices are connecting via the gateway connection. For example, the network management device may provide information to a home subscriber server (HSS) indicating that the secondary user devices are utilizing the gateway connection via the gateway user device.

In this way, a network management device may facilitate establishment of a gateway connection via a gateway user device, thereby easing network congestion and improving network performance.

Figure 2:
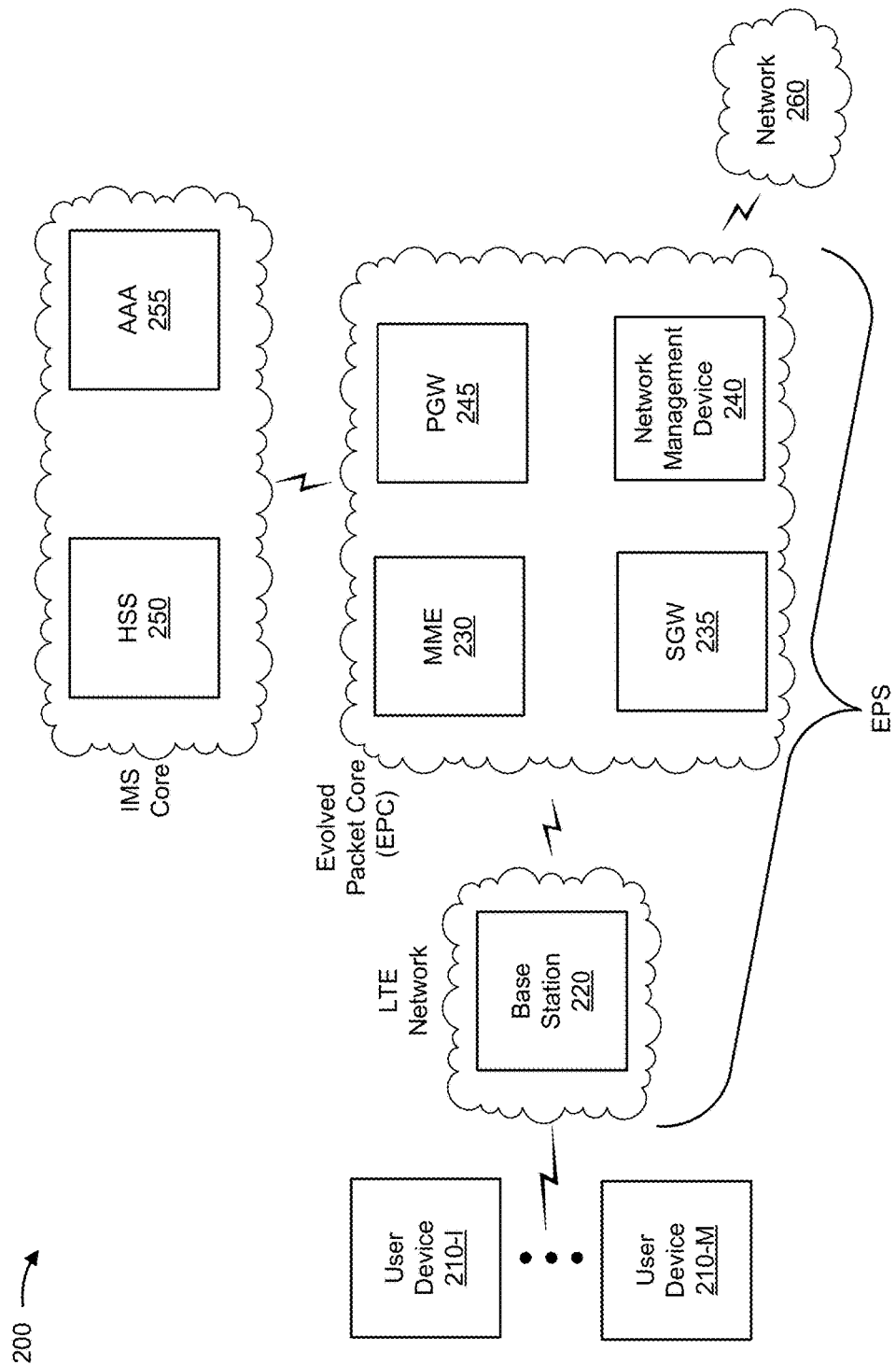
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210-1 through 210-M (M≥1) (hereinafter referred to collectively as "user devices 210," and individually as "user device 210"); a base station 220; a mobility management entity device (MME) 230; a serving gateway (SGW) 235; a network management device 240; a packet data network gateway (PGW) 245; a home subscriber server (HSS) 250; an authentication, authorization, and accounting server (AAA) 255; and a network 260. Devices of environment 200 may interconnect via wired connections, wireless connections, or a combination of wired and wireless connections.

Some implementations are described herein as being performed within an LTE network for explanatory purposes. Some implementations may be performed within a network that is not an LTE network, such as a third generation (3G) network, an HSPA+ network, or the like.

Environment 200 may include an evolved packet system (EPS) that includes an LTE network and/or an evolved packet core (EPC) that operate based on a third generation partnership (3GPP) wireless communication standard. The LTE network may include a radio access network (RAN) that includes one or more base stations 220 that take the form of evolved Node Bs (eNBs) via which user device 210 communicates with the EPC. The EPC may include MME 230, SGW 235, network management device 240, and/or PGW 245 that enable user device 210 to communicate with network 260 and/or an Internet protocol (IP) multimedia subsystem (IMS) core. The IMS core may include HSS 250 and/or AAA 255, and may manage device registration and authentication, session initiation, etc., associated with user devices 210. HSS 250 and/or AAA 255 may reside in the EPC and/or the IMS core.

User device 210 may include one or more devices capable of communicating with base station 220 and/or a network (e.g., network 260). For example, user device 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. User device 210 may send traffic to and/or receive traffic from network 260 (e.g., via base station 220, SGW 235, and/or PGW 245). In some implementations, user device 210 may be associated with one or more modes, such as a primary connection mode, a secondary connection mode, and/or a gateway connection mode. In some implementations, user device 210 may switch from a first mode to a second mode based on a trigger, such as a user interaction, an instruction from network management device 240, receiving information from another user device 210, or the like. In some implementations, user device 210 may transfer network traffic to/from base station 220 for another user device 210.

Base station 220 may include one or more devices capable of transferring traffic, such as audio, video, text, and/or other traffic, destined for and/or received from user device 210. In some implementations, base station 220 may include an eNB associated with the LTE network that receives traffic from and/or sends traffic to network 260 via SGW 235 and/or PGW 245. Additionally, or alternatively, one or more base stations 220 may be associated with a RAN that is not associated with the LTE network. Base station 220 may send traffic to and/or receive traffic from user device 210 via an air interface. In some implementations, base station 220 may include a small cell base station, such as a base station of a microcell, a picocell, and/or a femtocell.

MME 230 may include one or more devices, such as one or more server devices, capable of managing authentication, activation, deactivation, and/or mobility functions associated with user device 210. In some implementations, MME 230 may perform operations relating to authentication of user device 210. Additionally, or alternatively, MME 230 may facilitate the selection of a particular SGW 235 and/or a particular PGW 245 to serve traffic to and/or from user device 210. MME 230 may perform operations associated with handing off user device 210 from a first base station 220 to a second base station 220 when user device 210 is transitioning from a first cell associated with the first base station 220 to a second cell associated with the second base station 220. Additionally, or alternatively, MME 230 may select another MME (not pictured), to which user device 210 should be handed off (e.g., when user device 210 moves out of range of MME 230).

SGW 235 may include one or more devices capable of routing packets. For example, SGW 235 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 235 may aggregate traffic received from one or more base stations 220 associated with the LTE network, and may send the aggregated traffic to network 260 (e.g., via PGW 245) and/or other network devices associated with the EPC and/or the IMS core. SGW 235 may also receive traffic from network 260 and/or other network devices, and may send the received traffic to user device 210 via base station 220. Additionally, or alternatively, SGW 235 may perform operations associated with handing off user device 210 to and/or from an LTE network.

Network management device 240 may include one or more devices, such as one or more server devices, capable of receiving, generating, storing, processing, and/or providing information associated with a gateway connection. For example, network management device 240 may select a user device 210 as a gateway user device 210, may instruct a set of primary user devices 210 to connect to gateway user device 210 as a set of secondary user devices 210, or the like. In some implementations, network management device 240 may provide credential information associated with accessing a gateway connection (e.g., a password, a security key, or the like), may update one or more network devices such as SGW 235, PGW 245, HSS 250, and/or AAA 255 to indicate that a secondary user device 210 is accessing network 260 via a gateway user device 210.

PGW 245 may include one or more devices capable of providing connectivity for user device 210 to external packet data networks (e.g., other than the depicted EPC and/or LTE network). For example, PGW 245 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 245 may aggregate traffic received from one or more SGWs 235, and may send the aggregated traffic to network 260. Additionally, or alternatively, PGW 245 may receive traffic from network 260, and may send the traffic to user device 210 via SGW 235 and base station 220. PGW 245 may record data usage information (e.g., byte usage), and may provide the data usage information to AAA 255.

HSS 250 may include one or more devices, such as one or more server devices, capable of managing (e.g., receiving, generating, storing, processing, and/or providing) information associated with user device 210. For example, HSS 250 may manage subscription information associated with user device 210, such as information that identifies a subscriber profile of a user associated with user device 210, information that identifies services and/or applications that are accessible to user device 210, location information associated with user device 210, a network identifier (e.g., a network address) that identifies user device 210, information that identifies a treatment of user device 210 (e.g., quality of service information, a quantity of minutes allowed per time period, a quantity of data consumption allowed per time period, etc.), and/or similar information. HSS 250 may provide this information to one or more other devices of environment 200 to support the operations performed by those devices.

AAA 255 may include one or more devices, such as one or more server devices, that perform authentication, authorization, and/or accounting operations for communication sessions associated with user device 210. For example, AAA 255 may perform authentication operations for user device 210 and/or a user of user device 210 (e.g., using one or more credentials), may control access, by user device 210, to a service and/or an application (e.g., based on one or more restrictions, such as time-of-day restrictions, location restrictions, single or multiple access restrictions, read/write restrictions, etc.), may track resources consumed by user device 210 (e.g., a quantity of voice minutes consumed, a quantity of data consumed, etc.), and/or may perform similar operations.

Network 260 may include one or more wired and/or wireless networks. For example, network 260 may include a cellular network (e.g., an LTE network, an HSPA+ network, a 3G network, a code division multiple access (CDMA) network, etc.), a public land mobile network (PLMN), a wireless local area network (WLAN) (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

Although implementations, described herein, are described in terms of utilizing an LTE network, implementations may be utilized with another type of network, such as an HSPA+ network, a 3G network, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
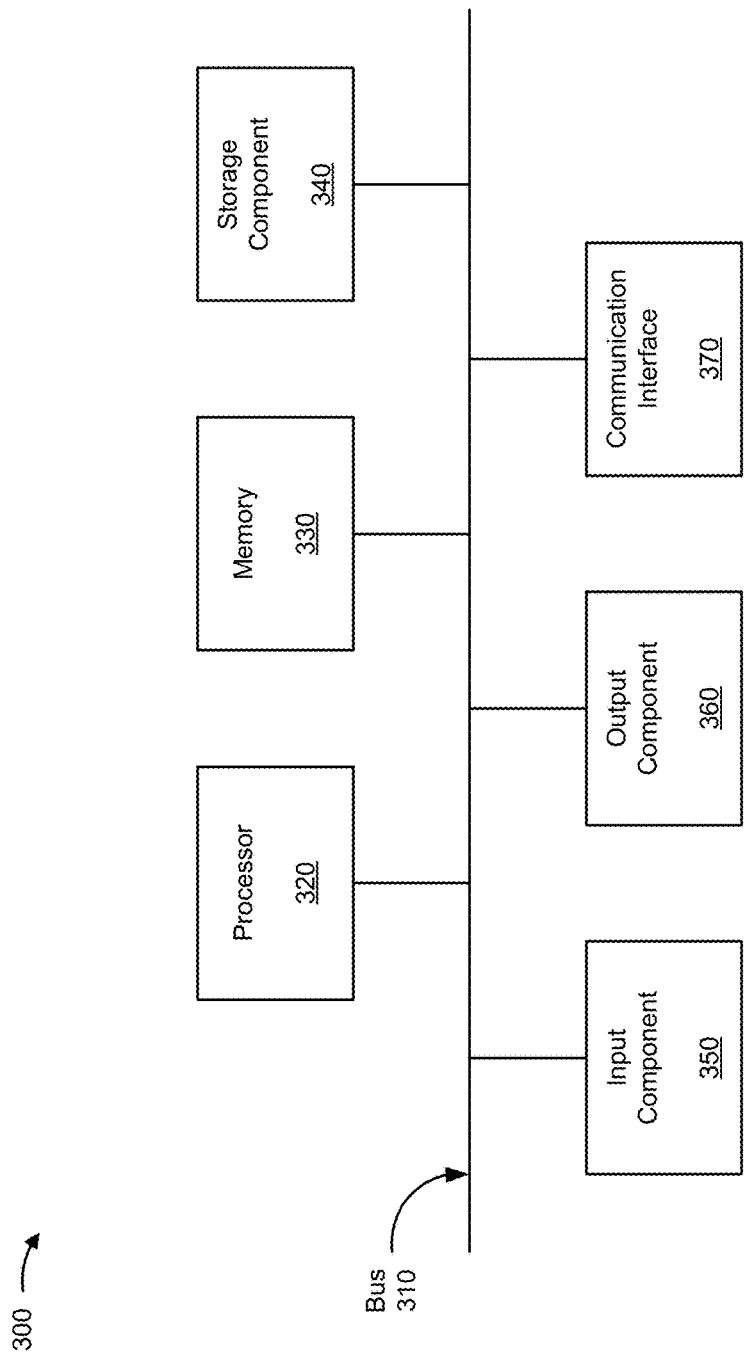
FIG. 3 is a diagram of example components of one or more devices of FIG. 2.

FIG. 3 is a diagram of example components of a device 300. Device 300 may correspond to user device 210, base station 220, MME 230, SGW 235, network management device 240, PGW 245, HSS 250, and/or AAA 255. In some implementations, user device 210, base station 220, MME 230, SGW 235, network management device 240, PGW 245, HSS 250, and/or AAA 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
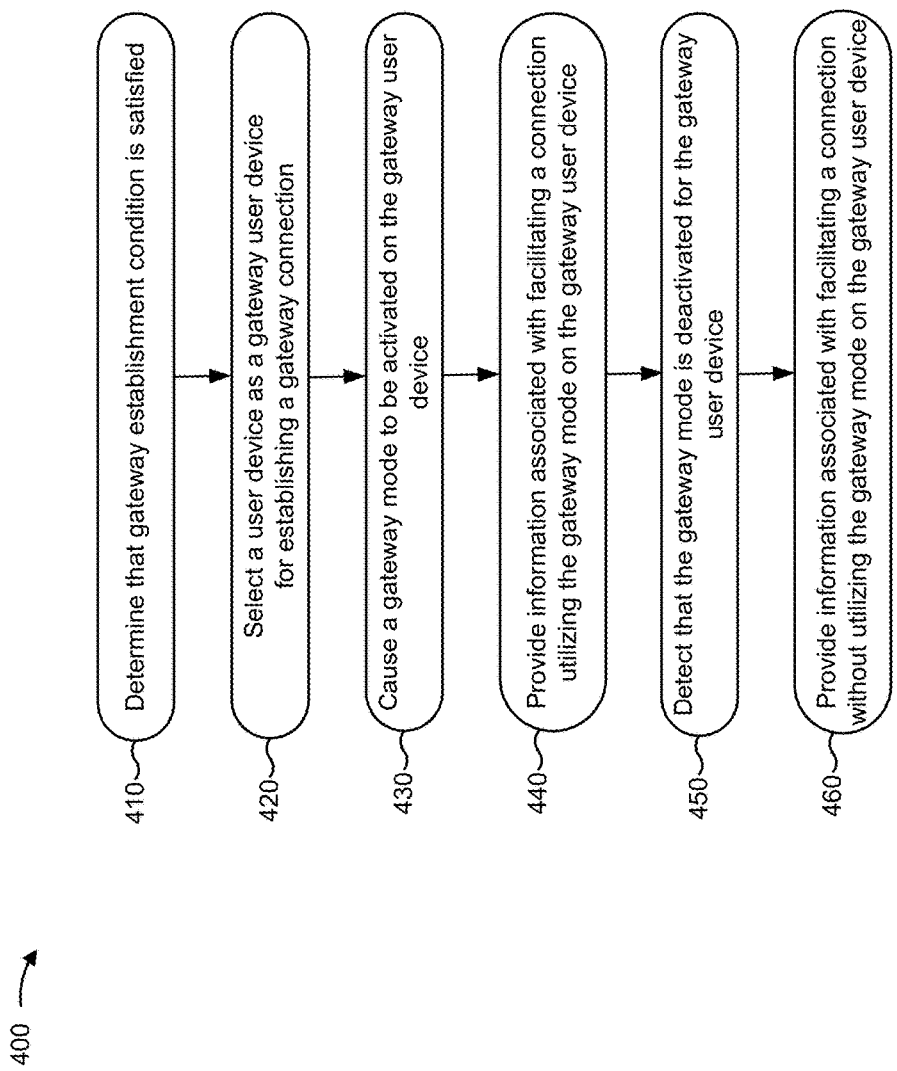
FIG. 4 is a flow chart of an example process for causing a gateway connection to be established for a set of user devices.

FIG. 4 is a flow chart of an example process 400 for causing a gateway connection to be established for a set of user devices. In some implementations, one or more process blocks of FIG. 4 may be performed by network management device 240. Additionally, or alternatively, one or more process blocks of FIG. 4 may be performed by another device or a set of devices separate from or including network management device 240, such as user device 210, base station 220, MME 230, SGW 235, PGW 245, HSS 250, and AAA 255.

As shown in FIG. 4, process 400 may include determining that a gateway establishment condition is satisfied (block 410). For example, network management device 240 may determine that the gateway establishment condition is satisfied. A gateway establishment condition may refer to a condition of an LTE network associated with determining whether to utilize user device 210 as a gateway user device. For example, a gateway establishment condition may include a threshold network resource utilization, a threshold quantity of bearers established, a threshold quantity of devices connected to base station 220, a threshold signal strength, one or more user device criteria (e.g., user device 210 being associated with a threshold quantity of processing resources, a threshold maximum quantity of connections, etc.), or the like.

In some implementations, network management device 240 may determine that the gateway establishment condition is satisfied based on receiving information from base station 220. For example, when the gateway establishment condition is a threshold quantity of user devices 210 connecting to base station 220, network management device 240 may receive information from base station 220 indicating the quantity of user devices 210 that are connecting to base station 220. In this way, a gateway connection may be established to reduce the quantity of user devices 210 connecting directly to base station 220, thereby allowing network resources to be allocated more efficiently. Additionally, or alternatively, when the gateway establishment condition is a threshold signal strength for user device 210, network management device 240 may receive information from user device 210 indicating a signal strength for a connection between user device 210 and base station 220. In this way, a gateway connection may be established when a first user device 210 has a signal strength above a threshold and a second user device 210 has a signal strength below a threshold, thereby facilitating second user device 210 connecting to base station 220 via a connection with first user device 210. Additionally, or alternatively, network management device 240 may combine, weight, and/or score multiple factors for a threshold score as the gateway establishment condition.

As further shown in FIG. 4, process 400 may include selecting a user device as a gateway user device for establishing a gateway connection (block 420). For example, network management device 240 may select a user device 210 as gateway user device 210. In some implementations, network management device 240 may select gateway user device 210 based on a set of selection criteria, such as a signal strength associated with a connection between gateway user device 210 and base station 220, a signal strength associated with an ad hoc network (e.g., a WLAN signal strength) associated with gateway user device 210, a model type of gateway user device 210, a quantity of computing resources associated with gateway user device 210, a battery life associated with gateway user device 210, or the like. In this way, network management device 240 may ensure that a selected user device 210 is associated with sufficient signal strength, computing resources, etc. to effectively provide a gateway connection for other user devices 210. Additionally, or alternatively, network management device 240 may select gateway user device 210 based on a connection type. For example, network management device 240 may select user device 210 based on user device 210 having an LTE connection to base station 220, a 3G connection to base station 220, a WLAN (e.g., Wi-Fi) connection to the Internet, or the like. In this way, network management device 240 may select a user device 210 for providing the gateway connection via a connection with sufficient bandwidth to support traffic transfer for secondary user devices 210. In some implementations, network management device 240 may combine, weight, and/or score multiple factors to select user device 210 for providing the gateway connection. In some implementations, network management device 240 may select multiple user devices 210 as gateway user devices 210.

In some implementations, network management device 240 may receive information associated with selecting gateway user device 210. For example, network management device 240 may receive a request from user device 210 to establish a gateway connection and may make a selection based on the request.

In some implementations, network management device 240 may provide an offer for compensation to a user of user device 210, for user device 210 to function as gateway user device 210, and user device 210 may provide an acceptance of the offer for compensation. For example, network management device 240 may provide an offer of money, a discount on a product, a quantity of rewards points, a discount on a wireless bill, a waived data usage charge, or the like. In this case, network management device 240 may select user device 210 based on receiving the acceptance.

As further shown in FIG. 4, process 400 may include causing a gateway mode to be activated on the gateway user device (block 430). For example, network management device 240 may provide information associated with causing gateway user device 210 to activate the gateway mode and establish a gateway connection. In this case, network management device 240 may provide particular information, such as an instruction message, a confirmation message, a configuration message, or the like that causes gateway user device 210 to activate the gateway mode. In some implementations, network management device 240 may provide information associated with configuring the gateway connection. For example, network management device 240 may provide information to base station 220 indicating that gateway user device 210 is utilizing a gateway mode, information instructing base station 220 to allocate network resources to gateway user device 210 to facilitate the gateway connection (e.g., an additional bandwidth allocation, a different quality of service (QoS) parameter, etc.), or the like.

In some implementations, network management device 240 may provide authentication information, such as a set of credentials that gateway user device 210 can match against other credentials provided by a secondary user device 210 to determine that secondary user device 210 is authorized to utilize the gateway connection. Additionally, or alternatively, network management device 240 may provide security information associated with facilitating network traffic transfer in the gateway mode, such as information associated with ensuring that network traffic provided via gateway user device 210 is secured. Additionally, or alternatively, network management device 240 may provide other configuration information, such as information indicating a type of ad hoc network to utilize for the gateway connection (e.g., a Wi-Fi ad hoc network, a cellular ad hoc network, a Bluetooth ad hoc network, or the like), information indicating a quantity of network resources that gateway user device 210 is to assign to the gateway connection, information indicating a quantity of computing resources that gateway user device 210 is to assign to the gateway connection, or the like.

As further shown in FIG. 4, process 400 may include providing information associated with facilitating a connection utilizing the gateway mode on the gateway user device (block 440). For example, network management device 240 may provide information to one or more secondary user devices 210, such as information identifying gateway user device 210, credential information for accessing a gateway connection being provided by gateway user device 210, or the like. In some implementations, network management device 240 may select one or more user devices 210 as the one or more secondary user devices 210. For example, network management device 240 may determine that a set of primary user devices 210 directly connected to base station 220 are associated with signal strengths failing to satisfy a threshold, and may provide information indicating that the set of primary user devices 210 are to switch modes to secondary user devices 210 connected to gateway user device 210.

In some implementations, network management device 240 may provide information to the one or more secondary user devices 210 based on receiving a request. For example, a secondary user device 210 may request login credentials for a gateway connection associated with gateway user device 210 from network management device 240, and network management device 240 may provide login credentials based on the request. Additionally, or alternatively, gateway user device 210 may request that network management device 240 authenticate a particular secondary user device 210 requesting utilization of the gateway connection.

In some implementations, network management device 240 may provide information to one or more network devices associated with facilitating a connection for secondary user device 210 via gateway user device 210. For example, network management device 240 may provide information to MME 230 and/or HSS 250 associated with locating secondary user device 210 when secondary user device 210 is connected via gateway user device 210. Additionally, or alternatively, network management device 240 may provide information to SGW 235 and/or PGW 245 associated with routing information to secondary user device 210, establishing bearers for secondary user device 210, or the like when secondary user device 210 is connected via gateway user device 210. In some implementations, network management device 240 may provide information to gateway user device 210, such as information authorizing secondary user device 210 to utilize a gateway connection, or the like.

In some implementations, network management device 240 may provide information to secondary user device 210 causing secondary user device 210 to enter an idle mode for a radio access network connection between secondary user device 210 and base station 220. Additionally, or alternatively, network management device 240 may cause secondary user device 210 to deregister from base station 220.

As further shown in FIG. 4, process 400 may include detecting that the gateway mode is deactivated for the gateway user device (block 450). For example, network management device 240 may detect that gateway user device 210 is not providing the gateway connection. In some implementations, network management device 240 may receive information from gateway user device 210, from base station 220, from secondary user device 210, or the like indicating that the gateway connection is not being provided. For example, gateway user device 210 may provide a message indicating that gateway user device 210 is being turned off. Additionally, or alternatively, gateway user device 210 may provide a message to network management device 240 indicating that gateway user device 210 is switching from the gateway connection mode to a primary connection mode, thereby eliminating the gateway connection.

In some implementations, network management device 240 may cause the gateway mode to be deactivated. For example, network management device 240 may determine that the gateway establishment condition is no longer satisfied (e.g., based on a quantity of user devices 210 failing to satisfy a threshold, based on a remaining battery power of gateway user device 210 failing to satisfy a threshold, etc.) and may provide information to gateway user device 210 indicating that gateway user device 210 may switch from the gateway connection mode to another mode. Additionally, or alternatively, network management device 240 may select another user device 210 to provide another gateway connection and may cause gateway user device 210 to eliminate the gateway connection when the other gateway connection is established.

As further shown in FIG. 4, process 400 may include providing information associated with facilitating a connection without utilizing the gateway mode on the gateway user device (block 460). For example, network management device 240 may provide information associated with facilitating another connection for a particular secondary user device 210. In some implementations, network management device 240 may provide information identifying another gateway user device 210 to which secondary user device 210 may connect, information indicating that secondary user device 210 may connect to base station 220 as a primary user device 210, or the like. In some implementations, network management device 240 may provide information to one or more other network devices. For example, network management device 240 may provide information to MME 230, SGW 235, PGW 245, HSS 250, AAA 255, or the like indicating that secondary user device 210 is not connected via gateway user device 210. Additionally, or alternatively, network management device 240 may provide information to the one or more other network devices indicating that secondary user device 210 is connected via another network connection.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example of causing a gateway connection to be established for a set of user devices.

Figure 5A:
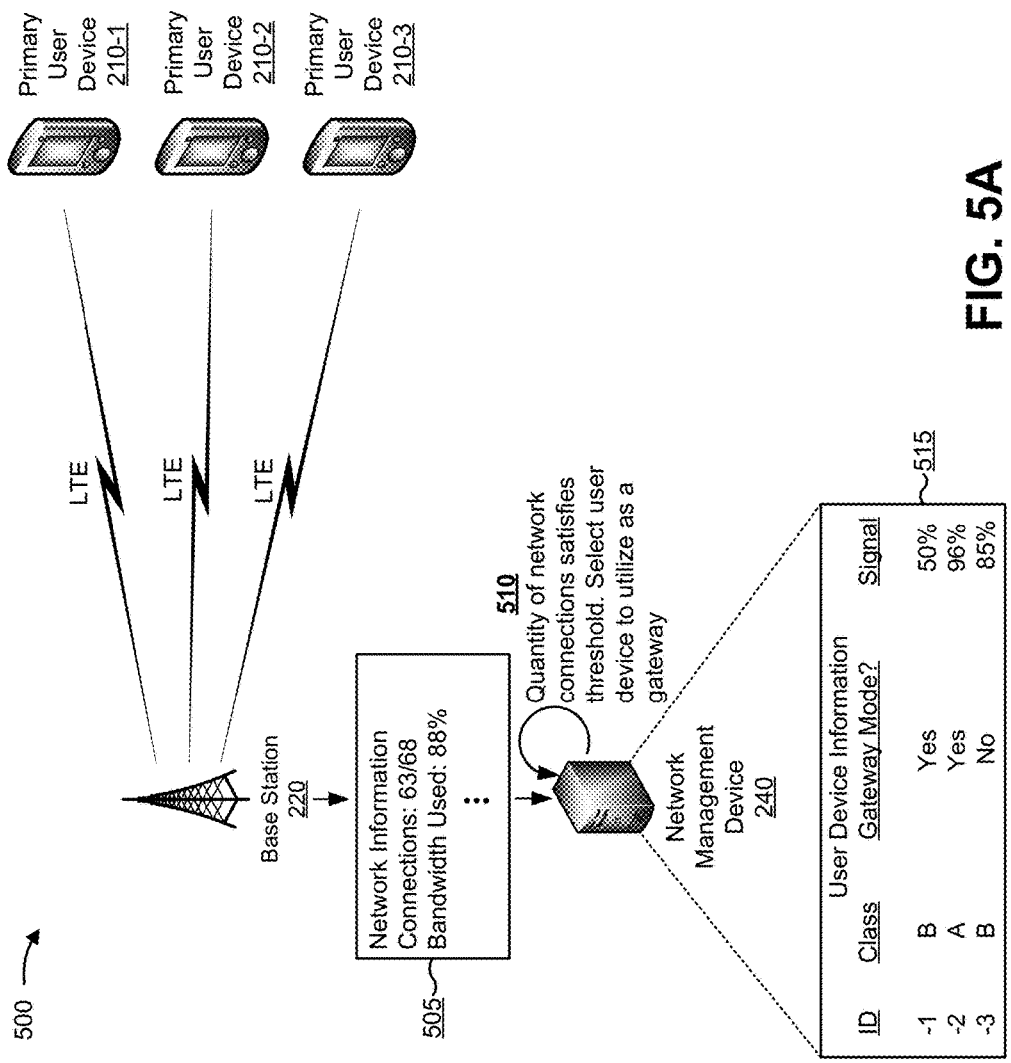
FIGS. 5A-5D are diagrams of an example implementation relating to the example process shown in FIG. 4.

As shown in FIG. 5A, base station 220 connects to a set of primary user devices 210 (e.g., primary user device 210-1, primary user device 210-2, and primary user device 210-3) via an LTE connection. As shown by reference number 505, base station 220 provides network information, to network management device 240, that includes information regarding a quantity of network connections, a percentage of bandwidth used, or the like. As shown by reference number 510, network management device 240 determines that the quantity of network connections satisfies a threshold. Network management device 240 includes access to data structure 515 storing information regarding the set of primary user devices 210. Based on information stored in data structure 515, network management device 240 may determine that primary user device 210-2 is capable of providing a gateway connection and is associated with a better signal strength than other primary user devices 210, and network management device 240 selects primary user device 210-2 for establishing a gateway connection.

Figure 5B:
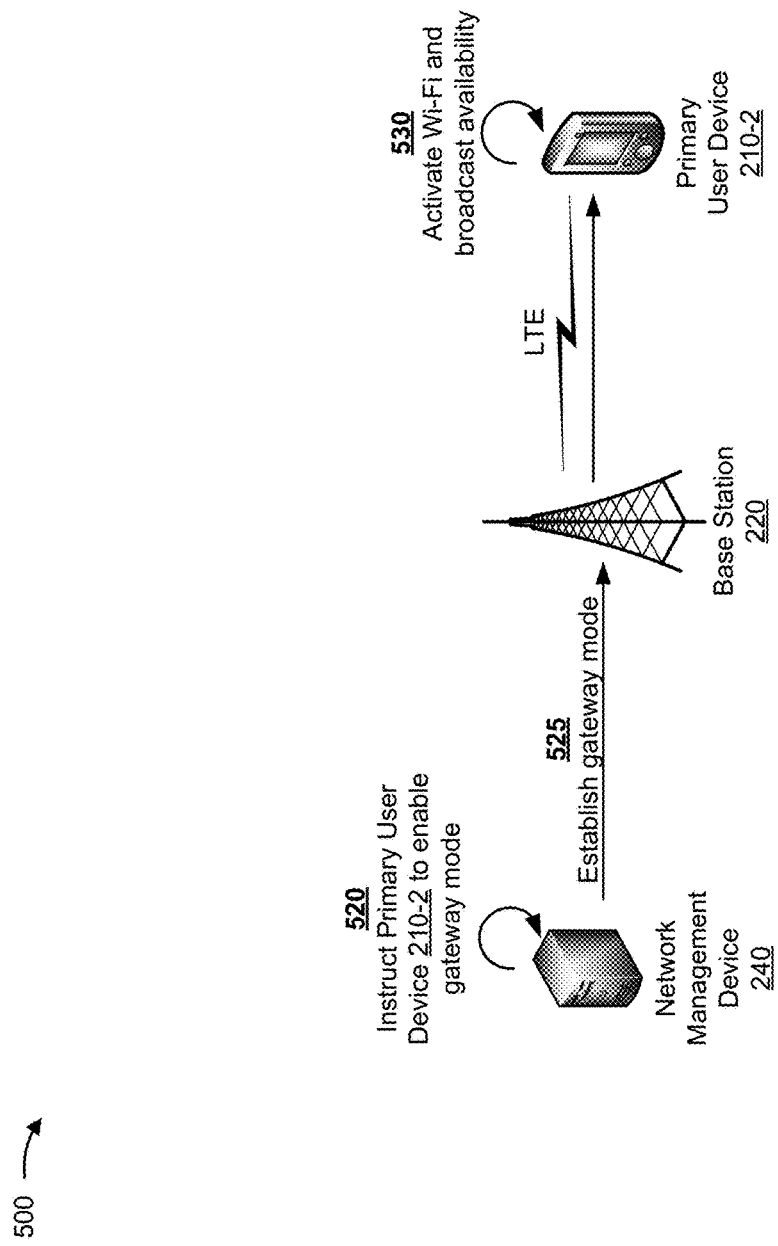

As shown in FIG. 5B, and by reference number 520, network management device 240 provides primary user device 210-2 with an instruction to enable a gateway mode. As shown by reference number 525, the instruction is received by base station 220 and provided to primary user device 210-2 via the LTE connection. As shown by reference number 530, based on receiving the instruction, primary user device 210-2 activates a WLAN (e.g., Wi-Fi) signal and broadcasts availability of a gateway connection via the WLAN signal. Primary user device 210-2 is now termed gateway user device 210-2.

Figure 5C:
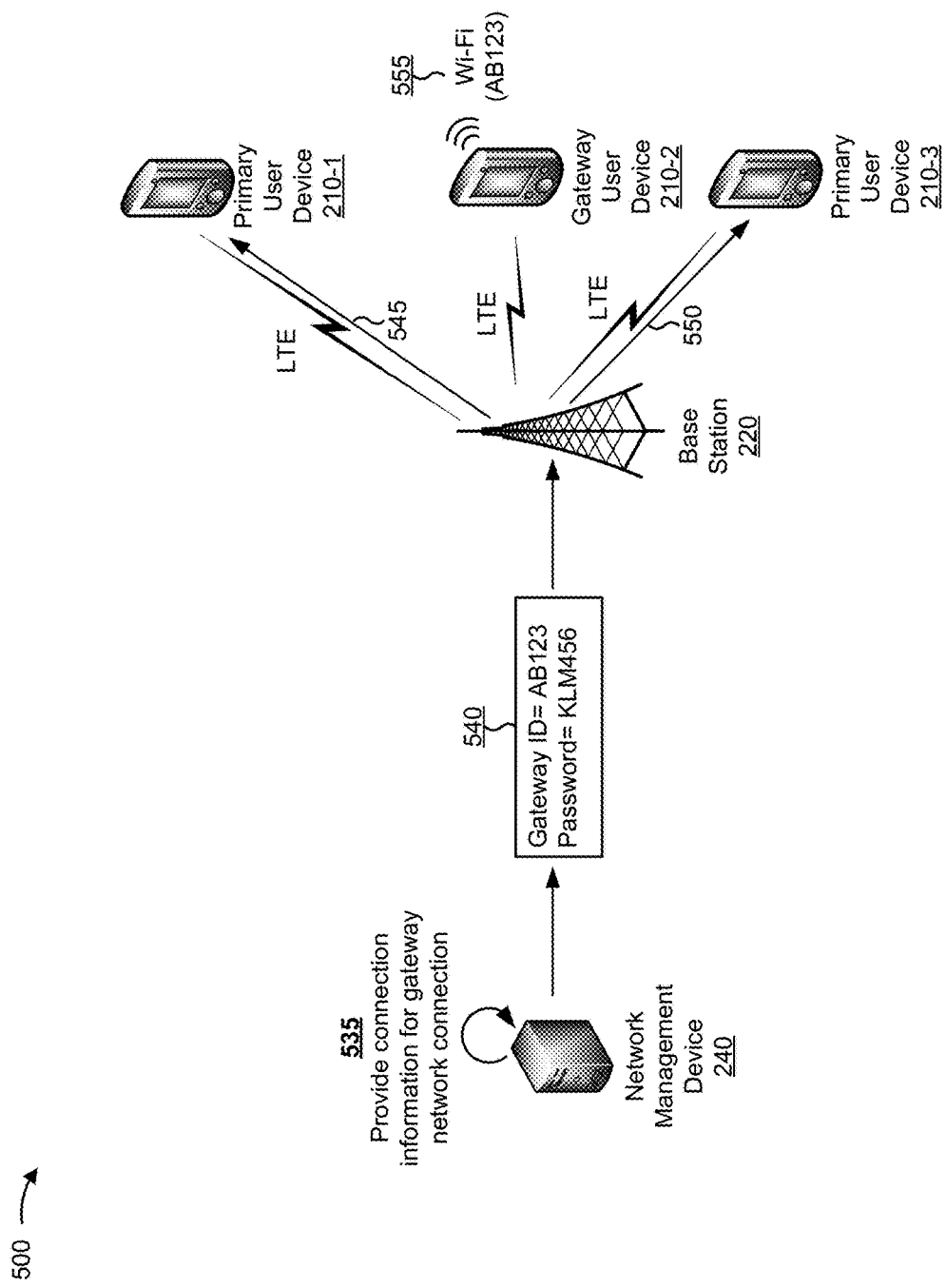

As shown in FIG. 5C, and by reference number 535, network management device 240 provides credential information for a gateway connection via gateway user device 210-2. As shown by reference number 540, the credential information includes information identifying the gateway connection (e.g., "Gateway ID=AB123") and information identifying a password for accessing the gateway connection (e.g., "Password=KLM456"). As shown by reference numbers 545 and 550, base station 220 transmits the credential information to primary user device 210-1 and primary user device 210-3 via an LTE connection. As shown by reference number 555, gateway user device 210-2 is broadcasting the gateway connection via WLAN (e.g., Wi-Fi). Assume that primary user device 210-1 and primary user device 210-3 request utilization of the gateway connection and provide the credential information received from network management device 240.

Figure 5D:
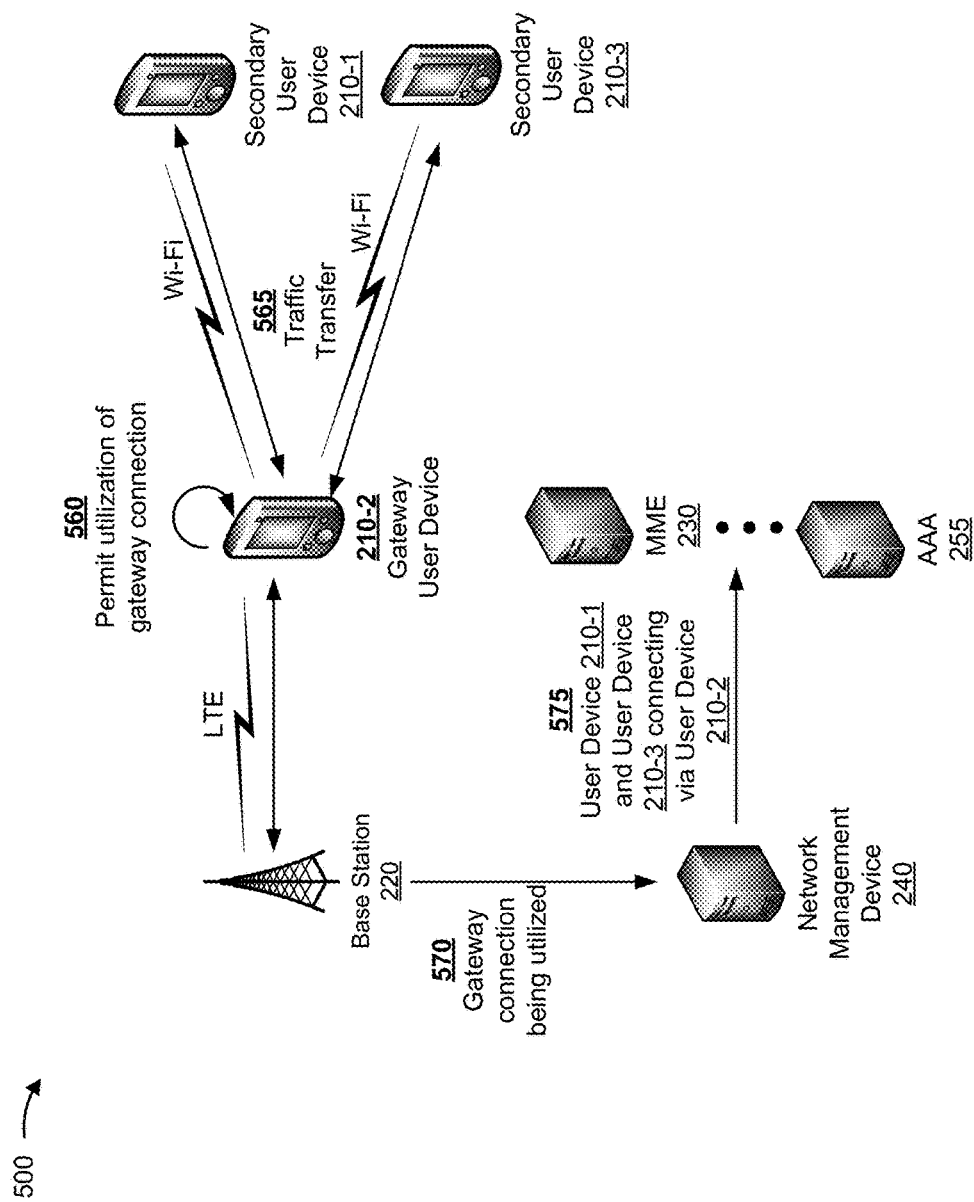

As shown in FIG. 5D, and by reference number 560, gateway user device 210-2 permits utilization of the gateway connection by secondary user device 210-1 and secondary user device 210-3 (formerly primary user device 210-1 and primary user device 210-3, respectively). As shown by reference number 565, secondary user devices 210-1 and 210-3 may transfer network traffic via the WLAN (e.g., Wi-Fi) connection with gateway user device 210-2 and the LTE connection from gateway user device 210-2 to base station 220. As shown by reference number 570, network management device 240 receives information from base station 220 indicating that the gateway connection is being utilized by secondary user device 210-1 and secondary user device 210-3. As shown by reference number 575, based on receiving the information from base station 220, network management device 240 provides information to a set of network devices (e.g., MME 230, AAA 255, etc.) indicating that secondary user device 210-1 and secondary user device 210-3 are connecting via gateway user device 210-2.

As indicated above, FIGS. 5A-5D are provided merely as an example. Other examples are possible and may differ from what was described with regard to FIGS. 5A-5D.

Figure 6:
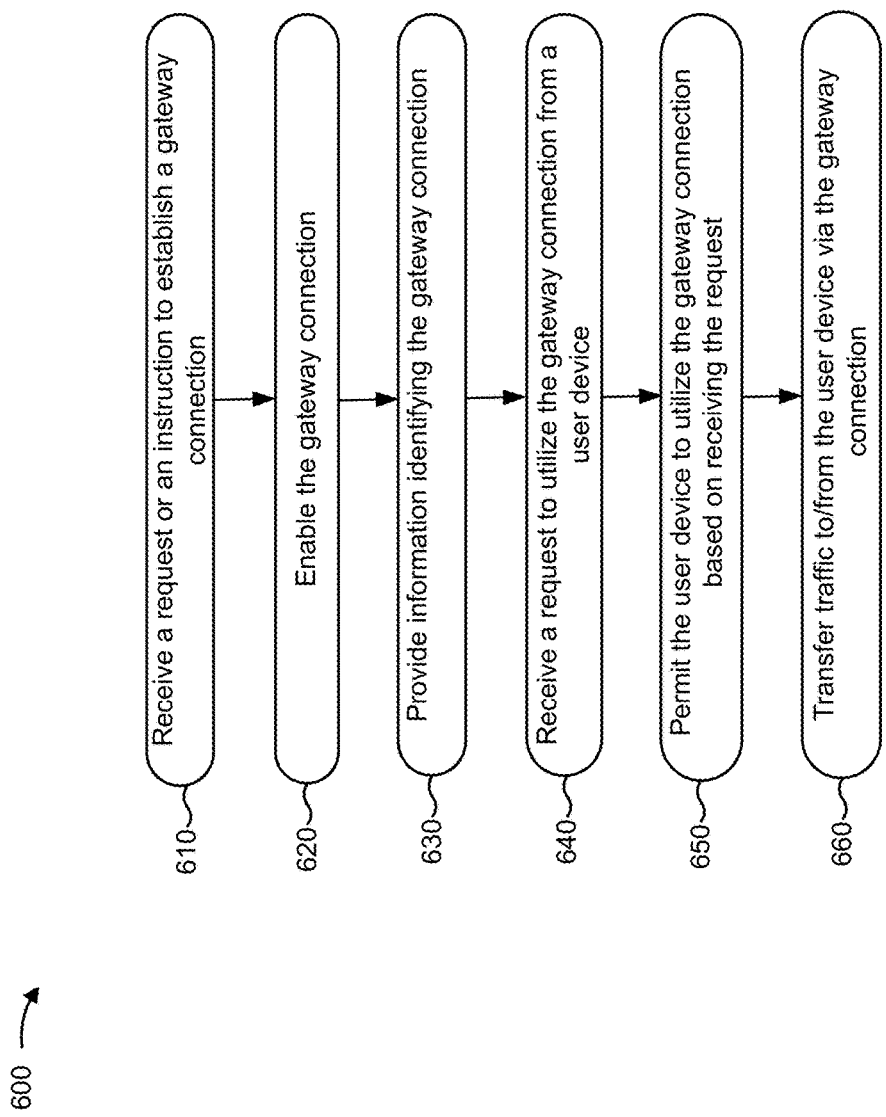
FIG. 6 is a flow chart of an example process for facilitating a gateway connection for a set of secondary user devices.

FIG. 6 is a flow chart of an example process 600 for facilitating a gateway connection for a set of secondary user devices. In some implementations, one or more process blocks of FIG. 6 may be performed by user device 210. Additionally, or alternatively, one or more process blocks of FIG. 6 may be performed by another device or a set of devices separate from or including user device 210, such as base station 220, MME 230, SGW 235, network management device 240, PGW 245, HSS 250, and AAA 255.

As shown in FIG. 6, process 600 may include receiving a request or an instruction to establish a gateway connection (block 610). For example, user device 210 (e.g., gateway user device 210) may receive a request or an instruction to establish a gateway connection from network management device 240. Additionally, or alternatively, gateway user device 210 may receive the request or instruction from secondary user device 210. In some implementations, gateway user device 210 may receive an offer of compensation with a request to establish the gateway connection. For example, network management device 240 may offer a particular compensation in exchange for establishing the gateway connection, and gateway user device 210 may provide the offer for acceptance by a user of gateway user device 210. In some implementations, gateway user device 210 may provide information indicating that gateway user device 210 is capable of enabling a gateway connection, and may receive the request or instruction based on providing the information.

As further shown in FIG. 6, process 600 may include enabling a gateway connection (block 620). For example, user device 210 (e.g., gateway user device 210) may enable a gateway mode to establish the gateway connection. In some implementations, gateway user device 210 may enable broadcasting of an ad hoc network, such as a WLAN (e.g., Wi-Fi) network, a Bluetooth network, or the like, to connect to a set of secondary user devices 210. Additionally, or alternatively, gateway user device 210 may utilize a network already being broadcast to connect to the set of secondary user devices 210. In some implementations, gateway user device 210 may assign a particular quantity of network resources, computing resources, or the like to the gateway connection when establishing the gateway connection.

In some implementations, gateway user device 210 may provide information to and/or receive information from base station 220 associated with establishing the gateway connection. For example, gateway user device 210 may request additional network resources to facilitate transferring traffic from one or more secondary user devices 210 via a connection with base station 220, and may receive response information associated with the request. In some implementations, gateway user device 210 may provide information to a user when enabling the gateway connection. For example, gateway user device 210 may provide information identifying the request that the gateway connection be established (e.g., information identifying an incentive for establishing the gateway connection, information identifying additional bandwidth allocated to the gateway connection, or the like) and may receive input confirming establishment of the gateway connection.

As further shown in FIG. 6, process 600 may include providing information identifying the gateway connection (block 630). For example, user device 210 (e.g., gateway user device 210) may provide information indicating that the gateway connection is established, such as information advertising the gateway connection to other user devices 210, information confirming establishment of the gateway connection to base station 220 and/or one or more other network devices, or the like. In some implementations, gateway user device 210 may provide security information associated with the gateway connection, such as an indication of a type of data encryption, an indication of a secure socket connection, a password, or the like. For example, gateway user device 210 may provide a password to network management device 240 for accessing the gateway connection and network management device 240 may provide the password to a set of authorized user devices 210. In some implementations, gateway user device 210 may provide information identifying the gateway connection via a particular communication channel, such as an overhead messaging channel, a side-channel, or the like. In some implementations, gateway user device 210 may provide information identifying a class of device, such as a type of gateway user device 210, a model of gateway user device 210, a processing capability of gateway user device 210, or the like.

As further shown in FIG. 6, process 600 may include receiving a request to utilize the gateway connection from a user device (block 640). For example, user device 210 (e.g., gateway user device 210) may receive, from another user device (e.g., secondary user device 210), a request to utilize the gateway connection. In some implementations, gateway user device 210 may receive credential information when receiving the request. For example, secondary user device 210 may provide a password, a security key, or the like to access the gateway connection. Additionally, or alternatively, gateway user device 210 may request, from secondary user device 210, credential information based on receiving the request. In some implementations, gateway user device 210 may receive the request via an ad hoc network associated with the gateway connection, such as a WLAN (e.g., Wi-Fi) network, a Bluetooth network, or the like. Additionally, or alternatively, gateway user device 210 may receive the request from base station 220. For example, network management device 240 may request utilization of the gateway connection for secondary user device 210, secondary user device 210 may request utilization of the gateway connection via an LTE connection with base station 220, or the like.

As further shown in FIG. 6, process 600 may include permitting the user device to utilize the gateway network connection based on receiving the request (block 650). For example, user device 210 (e.g., gateway user device 210) may confirm access to the gateway connection by another user device 210 (e.g., secondary user device 210). In some implementations, gateway user device 210 may allocate a particular quantity of network resources, computing resources, or the like to secondary user device 210. For example, gateway user device 210 may receive information from network management device 240 indicating that secondary user device 210 is to be assigned a particular quantity of network resources. Additionally, or alternatively, gateway user device 210 may determine to assign a particular quantity of network resources, computing resources, or the like based on a battery life associated with gateway user device 210, a total quantity of processing resources associated with gateway user device 210, a quantity of secondary user devices 210 connected to gateway user device 210, a quantity of network resources being utilized to serve the user of gateway user device 210, or the like.

As further shown in FIG. 6, process 600 may include transferring traffic to/from the user device via the gateway network connection (block 660). For example, user device 210 (e.g., gateway user device 210) may transfer traffic for another user device 210 (e.g., secondary user device 210). In some implementations, user device 210 may facilitate secure traffic transfer, such as via a secure Wi-Fi connection, a secure Internet Protocol (IP) connection, or the like.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the quantity of user devices connecting to a base station is reduced by utilizing a gateway user device to provide a gateway connection to the user devices via an ad hoc network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memory devices to store instructions;
one or more processors to execute the instructions to:
determine that a gateway establishment condition is satisfied,
the gateway establishment condition relating to a condition of a network associated with determining whether to utilize a user device as a gateway user device;
transmit an offer for compensation to a first user device;
select, based on receiving an acceptance of the offer for compensation, the first user device from a set of user devices to establish a gateway connection,
the first user device being selected based upon a set of selection criteria,
the first user device being connected to a base station,
the first user device being capable of establishing the gateway connection,
the first user device being capable of switching between a primary connection mode and a gateway mode,
the primary connection mode relating to when the first user device is connected to the base station and not being utilized to provide a gateway connection to a second user device, and
the gateway mode relating to when the first user device is being utilized to provide the gateway connection to the second user device,
the gateway connection being an ad hoc network connection between the second user device and the first user device that facilitates transfer of network traffic from the second user device to the base station via the first user device,
the ad hoc network connection being a wireless local area network connection, and
the first user device to provide, via the ad hoc network connection, information identifying available bandwidth via the gateway connection, information identifying a signal strength of a connection with the base station, and information identifying a maximum quantity of second user devices that may connect based on a predetermined threshold of connections,
the information identifying the available bandwidth via the gateway connection, the signal strength of the signal strength of the connection with the base station, and the maximum quantity of second user devices that may connect being detectable by other second user devices;
cause the gateway mode to be activated on the first user device based on selecting the first user device,
the gateway mode being associated with the first user device providing the gateway connection; and
transmit instructions to facilitate the second user device utilizing the gateway connection to transfer network traffic to the base station via the first user device,
the instructions including credential information,
the credential information including:
information identifying the gateway connection, and
information identifying a password for accessing the gateway connection,
the first user device receiving the network traffic from the second user device via the wireless local area network connection, and
the first user device routing the network traffic from the second user device to the base station.

2. The device of claim 1, where the one or more processors are further to:
determine that the first user device is associated with a signal strength for a connection to the base station that satisfies a signal strength threshold; and
where the one or more processors, when selecting the first user device, are to:
select the first user device based on the signal strength satisfying the signal strength threshold.

3. The device of claim 1, where the one or more processors are further to:
determine the credential information; and
provide the credential information to the second user device.

4. The device of claim 1, where the one or more processors, when transmitting instructions to facilitate the second user device utilizing the gateway connection, are to:
update information to indicate that the second user device is utilizing the gateway connection to transfer the network traffic to the base station.

5. The device of claim 1, where the one or more processors are further to:
cause the base station to assign a particular quantity of network resources to the first user device based on causing the gateway mode to be activated on the first user device.

6. The device of claim 1, where the one or more processors are further to:
receive network information indicating that a particular quantity of user devices are connected to the base station,
the particular quantity of user devices satisfying a connection threshold; and
where the one or more processors, when determining that the gateway establishment condition is satisfied, are to:
determine that the gateway establishment condition is satisfied based on the particular quantity of user devices satisfying the connection threshold.

7. The device of claim 1, where the one or more processors are further to:
select a third user device for providing another gateway connection; and cause the third user device to establish the other gateway connection based on selecting the third user device; and cause the first user device to eliminate the gateway connection based on causing the third user device to establish the other gateway connection.

8. A computer-readable medium storing instructions, the instructions comprising:
one or more instructions that, when executed by one or more processors, cause the one or more processors to:
receive a request or an instruction to enable a gateway connection,
the request or instruction including credential information,
the credential information including:
information identifying the gateway connection, and
information identifying a password for accessing the gateway connection,
the gateway connection being a connection between a first user device and a second user device that facilitates the second user device communicating with a base station via the first user device,
the gateway connection being a wireless local area network connection,
the first user device to provide, via the wireless local area network connection, information identifying available bandwidth via the gateway connection, information identifying a signal strength of a connection with the base station, and information identifying a maximum quantity of second user devices that may connect based on a predetermined threshold of connections,
the information identifying the available bandwidth via the gateway connection, the signal strength of the signal strength of the connection with the base station, and the maximum quantity of second user devices that may connect being detectable by other second user devices,
the first user device being connected to the base station,
the first user device being capable of switching between a primary connection mode and a gateway mode,
the primary connection mode relating to when the first user device is connected to the base station and not being utilized to provide a gateway connection to the second user device, and
the gateway mode relating to when the first user device is being utilized to provide the gateway connection to the second user device, the first user device being selected based upon a set of selection criteria;
receive an offer of compensation associated with the request to enable the gateway connection;
transmit information associated with an acceptance of the offer of compensation associated with the request to enable the gateway connection; and
enable the gateway connection based on receiving the request or the instruction to enable the gateway connection and based on transmitting the information associated with the acceptance of the offer of compensation,
the request or the instruction including the information identifying the gateway connection;
provide the information identifying the gateway connection based on enabling the gateway connection;

receive a request to utilize the gateway connection from the second user device based on providing the information identifying the gateway connection;
permit the second user device to utilize the gateway connection based on the request to utilize the gateway connection; and
cause network traffic to be transferred between the second user device and the base station via the first user device based on permitting the second user device to utilize the gateway connection,
the first user device receiving the network traffic from the second user device via the wireless local area network connection,
the first user device routing the network traffic from the second user device to the base station.

9. The computer-readable medium of claim 8, where the one or more instructions, when executed by the one or more processors, further cause the one or more processors to:
receive credential information from the second user device;
determine that the credential information is valid; and
where the one or more instructions, that cause the one or more processors to permit the second user device to utilize the gateway connection, cause the one or more processors to:
permit the second user device to utilize the gateway connection based on determining that the credential information is valid.

10. The computer-readable medium of claim 8, where the one or more instructions, that cause the one or more processors to provide information identifying the gateway connection, cause the one or more processors to:
provide information identifying the first user device.

11. The computer-readable medium of claim 8, where the one or more instructions, that cause the one or more processors to cause network traffic to be transferred between the second user device and the base station via the first user device, cause the one or more processors to:
cause the network traffic to be transferred using a secure connection between the second user device and the base station via the first user device.

12. The computer-readable medium of claim 8, where the one or more instructions, that cause the one or more processors to permit the second user device to utilize the gateway connection, cause the one or more processors to:
cause the second user device to enter an idle mode for a connection between the second user device and the base station,
the connection between the second user device and the base station being a radio access network connection that is independent of the first user device.

13. The computer-readable medium of claim 8, where the one or more instructions, when executed by the one or more processors, further cause the one or more processors to:
provide information indicating that the first user device is available for enabling the gateway connection; and
where the one or more instructions, that cause the one or more processors to receive the request or the instruction to enable the gateway connection, cause the one or more processors to:
receive the request or the instruction to enable the gateway connection after providing information indicating that the first user device is available for enable the gateway connection.

14. A method, comprising:
receiving, by a device, information associated with establishing a gateway connection, the gateway connection being an ad hoc connection to a user device that permits the user device to transfer network traffic to/from a base station via another user device and without the user device directly connecting to the base station,
the ad hoc connection being a wireless local area network connection, and
the other user device to provide, via the ad hoc connection, information identifying available bandwidth via the gateway connection, information identifying a signal strength of a connection with the base station, and information identifying a maximum quantity of second user devices that may connect based on a predetermined threshold of connections,
the information identifying the available bandwidth via the gateway connection, the signal strength of the signal strength of the connection with the base station, and the maximum quantity of second user devices that may connect being detectable by other second user devices,
the information being associated with determining that a gateway establishment condition is satisfied,
the gateway establishment condition relating to a condition of a network associated with determining whether to utilize the other user device as a gateway user device,
the other user device being capable of switching between a primary connection mode and a gateway mode,
the primary connection mode relating to when the other user device is connected to the base station and not being utilized to provide the gateway connection to the user device, and
the gateway mode relating to when the other user device is being utilized to provide the gateway connection to the user device, the other user device being selected based upon a set of selection criteria;
transmitting, by the device, an offer for compensation to the other device,
the other device being selected based upon receiving an acceptance of the offer for compensation;
causing, by the device, the gateway connection to be established based on the information associated with establishing the gateway connection and based on the other device being selected; and
causing, by the device and based on credential information, the user device to utilize the gateway connection to transfer network traffic to/from the base station,
the credential information including:
information identifying the gateway connection, and
information identifying a password for accessing the gateway connection,
the user device receiving the network traffic from the other user device via the wireless local area network connection,
the user device routing the network traffic from the other user device to the base station.

15. The method of claim 14,
where causing the gateway connection to be established comprises:
causing the other user device to establish the gateway connection.

16. The method of claim 14, further comprising:
causing a particular quantity of network resources to be assigned for the gateway connection based on causing the gateway connection to be established.

17. The computer-readable medium of claim 8, where the one or more instructions, when executed by the one or more processors, further cause the one or more processors to:
select a third user device for providing another gateway connection;
cause the third user device to establish the other gateway connection based on selecting the third user device; and
cause the first user device to eliminate the gateway connection based on causing the third user device to establish the other gateway connection.

18. The computer-readable medium of claim 8, where the one or more instructions, when executed by the one or more processors, further cause the one or more processors to:
cause the base station to assign a particular quantity of network resources to the first user device based on causing the gateway mode to be activated on the first user device.

19. The method of claim 14, further comprising:
causing the base station to assign a particular quantity of network resources to the user device based on causing the gateway mode to be activated on the other user device.

20. The computer-readable medium of claim 8, where the one or more instructions, that cause the one or more processors to receive the request or the instruction to enable the gateway connection, are to:
provide security information associated with the gateway connection,
the security information associated with the gateway connection including:
an indication of a type of data encryption,
an indication of a secure socket connection, or
a password.

* * * * *